United States Patent [19]

Foote

[11] 4,423,658

[45] Jan. 3, 1984

[54] GRAND PIANO HUMIDIFIER

[76] Inventor: Allen M. Foote, P.O. Box 68, Dana, N.C. 28724

[21] Appl. No.: 289,896

[22] Filed: Aug. 4, 1981

[51] Int. Cl.[3] ........................ G10C 3/00; G05D 22/02

[52] U.S. Cl. .................................. 84/453; 236/44 R; 237/78 R; 248/125

[58] Field of Search ............ 84/453; 237/78 R, 78 A; 248/125

[56] References Cited

U.S. PATENT DOCUMENTS 1,922,704 8/1933 Magney .......................... 237/78 R 3,672,568 6/1972 Foote ............................. 219/274 X

*Primary Examiner*—Lawrence R. Franklin

*Attorney, Agent, or Firm*—Harvey B. Jacobson

[57] ABSTRACT

A humidifier adapted to be associated with a grand piano to facilitate the control of humidity conditions and which also can be used to humidify any small enclosed area. The humidifier includes a tank having a supply of water therein, a heating element and evaporator pads disposed at the top of the tank and a unique supporting assembly for the tank to support the tank from the top of the braces or posts in a grand piano or between the rim and an adjacent brace or posts or between the rims with the supporting structure including support rods and clips or telescoping tube assemblies. A distribution shield or baffle having depending skirts is disposed above the tank and supported from the support rods or tubes and extends throughout the length and width of the tank so that it will spread moisture more evenly in relation to the components of the piano.

13 Claims, 11 Drawing Figures

GRAND PIANO HUMIDIFIER

BACKGROUND OF THE INVENTION

1. Field of the Invention

The present invention generally relates to the control of humidity conditions within a piano and more particularly a humidifier which can be supported in substantially concealed relation to a grand piano and effectively control the humidity conditions therein when combined with a humidity control system with the humidifier including a tank, heater, evaporative pads, supporting structure and a distribution baffle shield arrangement.

2. Description of the Prior Art

My prior U.S. Pat. No. 2,511,910 issued June 20, 1950; U.S. Pat. No. 3,119,977 issued Jan. 28, 1964; U.S. Pat. No. 3,664,579 issued May 23, 1972; U.S. Pat. No. 3,672,568 issued June 27, 1972 and U.S. Pat. No. 4,150,372 issed Apr. 17, 1979, relate to heating devices and humidity control for pianos and the like with U.S. Pat. No. 3,672,568 specifically disclosing a humidifier and U.S. Pat. Nos. 3,664,579 and 4,150,372 disclosing humidity control systems, humidistats, and the like.

In addition, prior U.S. Pat. Nos. 1,650,004, 2,062,065; 3,407,700 and 3,721,152 disclose other devices for drying, cleaning and humidifying musical instruments.

However, when the devices disclosed in my above-mentioned prior patents are installed in grand pianos, some of the components are sometimes observable and tend to detract from the appearance characteristics of the piano. Also, grand pianos have structural arrangements which render it difficult to support the structures disclosed in my prior patents in an effective manner.

SUMMARY OF THE INVENTION

An object of the present invention is to provide a humidifier for a grand piano or other small enclosed areas or spaces in which the humidifier includes a tank supported transversely of its ends at the upper edge thereof by supporting rods or tubes connected with components of the grand piano by supporting structure with the tank including a supply of water, evaporative pads, a heater supporting the evaporative pads with the lower ends thereof in the water and a distribution shield or baffle overlying the tank for more even distribution of moisture in relation to the grand piano.

Another object of the invention is to provide a humidifier in accordance with the preceding object in which the tank is retained in position on the supporting rods or tubes by grommet structures or clamps and the baffle is in the form of an inverted channel-shaped plastic member having transverse split plastic tubes securing the same to supporting rods with the baffle or distribution shield being disposed above the tank and below the soundboard and ribs of the grand piano.

Still another object of the invention is to provide a humidifier in accordance with the preceding objects in which the components are readily and easily supported in substantially concealed relation below a grand piano soundboard and ribs with the device being easy to install and easy to service and associated with a humidistat to control humidity conditions within the grand piano.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
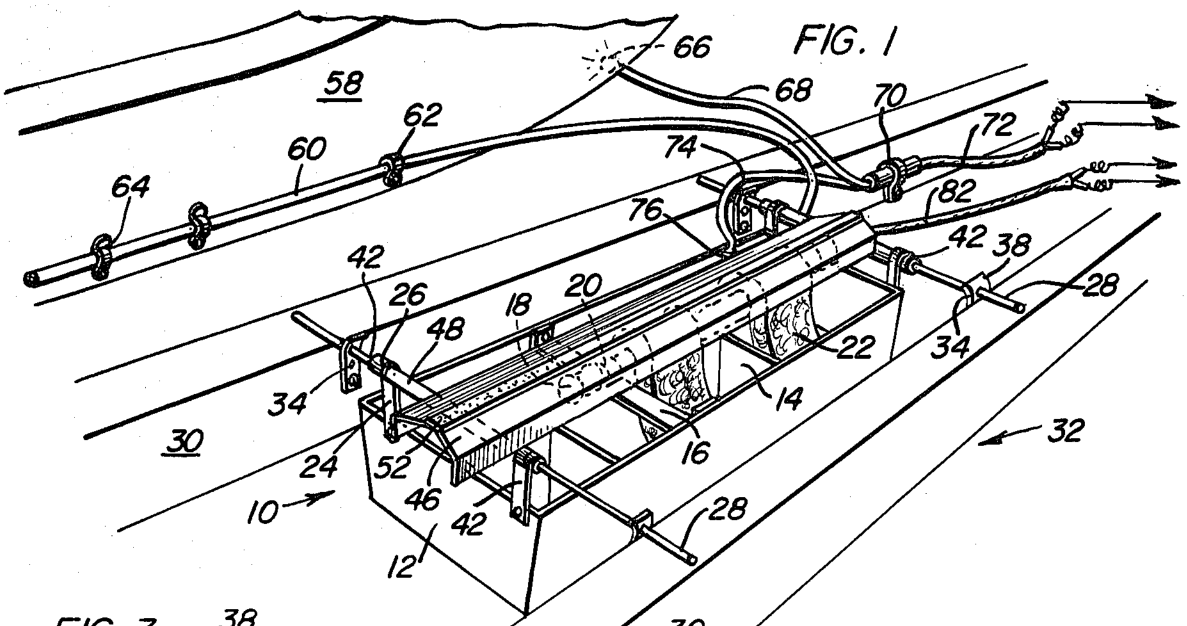
FIG. 1 is a perspective view of the humidifier of the present invention illustrating the installation thereof between adjacent braces on a grand piano.

Referring now specifically to FIGS. 1–6 of the drawings, the humidifier of the present invention is generally designated by the numeral 10 and includes a tank 12 which is of generally rectangular configuration and provided with vertical or slightly outwardly inclined end and side walls interconnected by a bottom wall. The tank is similar to that disclosed in my prior patents and includes vertical baffles 14 extending transversely thereof between the side walls and a pair of straps or brackets 16 extending across the top of the tank for supporting a heater 18 by virtue of clips 20 securing the heating element to the bracket straps 16. Evaporative pads 22 are suspended over the heater 18 with their lower ends disposed in the water to facilitate evaporation of water from the tank when the heater 18 is actuated. This structure is substantially the same as that disclosed in my aforementioned patents particularly U.S. Pat. Nos. 3,672,568 and 4,150,372.

Figure 6:
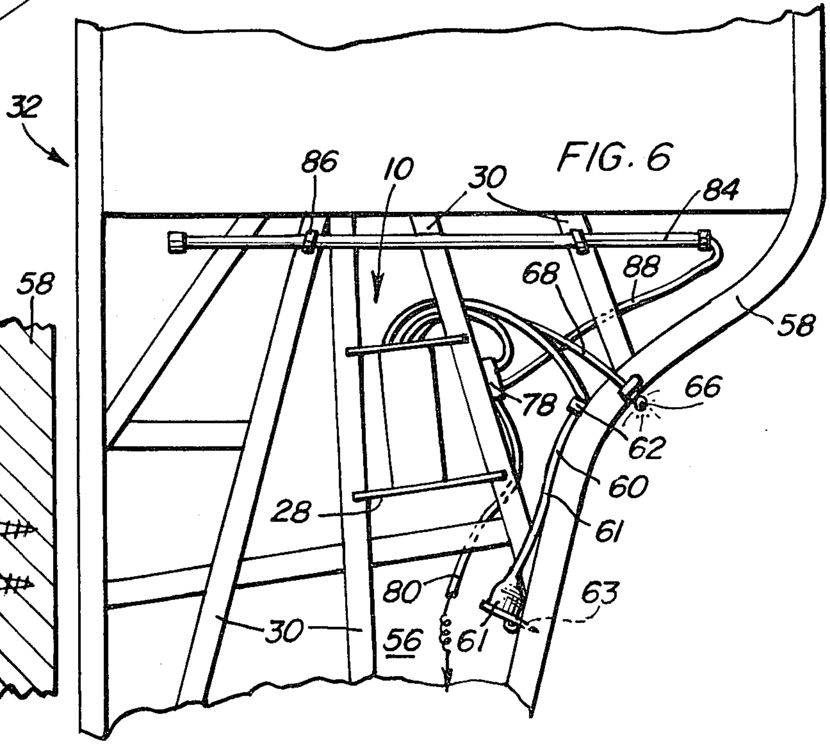
FIG. 6 is a bottom plan schematic view illustrating the components of the grand piano, the humidifier and control arrangement associated therewith.

In order to support the tank 12, the end walls are provided with upstanding brackets 24 in the form of straps having outturned hooks 26 thereon which open downwardly. Positioned through each pair of hooks 26 is a support rod 28 with the support rod paralleling the end wall of the tank 12 and spaced above the top edge thereof. Similar support rods 28 are positioned at each end of the tank and the end walls of the tank each have two supporting brackets 24 thereon which are spaced transversely apart but in transverse alignment for slidably receiving the support rods 28. The ends of the support rods 28 project into overlying relation to the upper surface of adjacent braces 30 forming part of the grand piano 32 as illustrated in FIG. 6.

Figure 2:
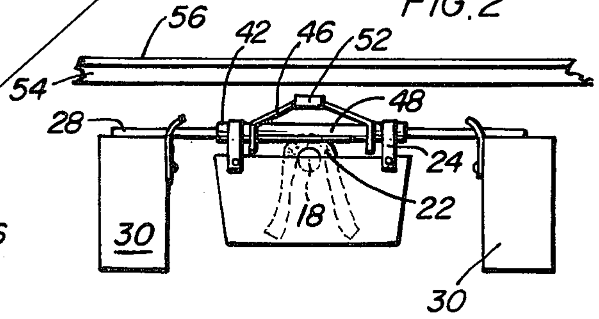
FIG. 2 is an end view of the humidifier further illustrating its association with the braces, soundboard and ribs of the grand piano.
Figure 3:
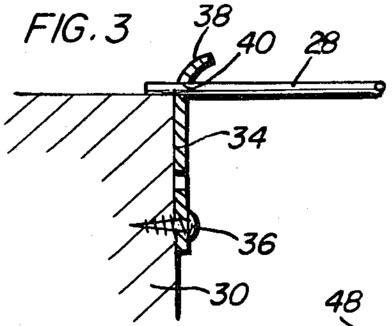
FIG. 3 is an enlarged sectional view illustrating a supporting clip for the ends of the support rods when the support rods pass over top of a brace.
Figure 4:
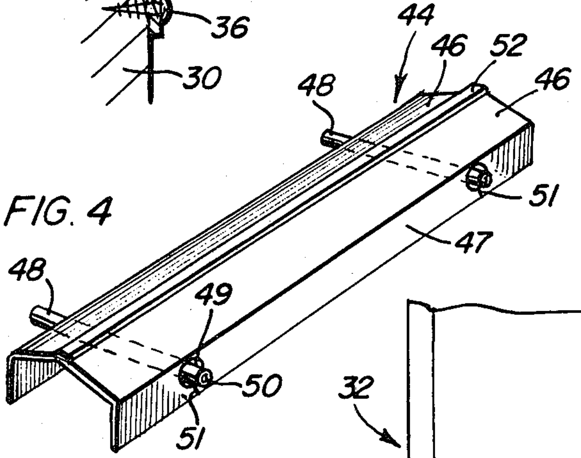
FIG. 4 is a perspective view of a moisture distribution baffle or shield.

Each end of each rod 28 is supported by a clip 34 secured to the brace 30 by fasteners such as screw threaded fasteners 36. The upper end of the clip 34 is offset or curved as at 38 and provided with an aperture 40 which receives the end of the support rod 28 in a frictional gripping relationship to secure the rod to the brace 30. The curvature of the upper ends of the clips is such that when the clips are in their normal position, they frictionally engage the rod and the edges of the aperture 40 bite into the surface of the rod 28 to secure the rod longitudinally in position, although by flexing the upper end of the clip 34 to a substantially straight line condition, the rod 28 can then be moved longitudinally of the clip to facilitate installation of the tank and removal thereon when desired. Rubber grommets 42 are positioned on the rod 28 outwardly of each of the hooks 26 on the bracket straps 24 to centrally position the tank 12 on the rods 28 substantially equally between the braces 30 as illustrated in FIG. 2.

Positioned above the water tank 12 is a baffle generally designated by numeral 44 which is constructed of plastic material and is of inverted shallow V-shaped configuration and serves to more evenly distribute the moisture produced by the heater 18 evaporating water from the tank 12. The baffle 44 includes a pair of flat wings 46 joined together at an apex and being of one-piece construction with the outer edges of the wings 46 being secured to a pair of transversely extending plastic tubes 48 which are in parallel relation to each other and spaced longitudinally of the baffle 44 a distance equal to the spacing between the support rods 28. The tubes 48 are longitudinally split on the bottom as at 50 in order to snap down over and fit on the rods 28 with the split tubes 48 being constructed of vinyl plastic, or the like, with the lower surface thereof provided with a groove which enables the diameter of the tubes 48 to increase as they are pushed down on the support rods 28 so that they snap onto the rods. The tubes 48 are substantially equal in length to the distance between the hook-shaped ends 26 on the support straps 24 so that the baffle 44 is substantially centralized over the tank 12. The apex of the baffle 44 is provided with a felt strip 52 secured thereto by adhesive, or the like, which serves as an anti-rattling device in the event the apex of the baffle comes into contact with the ribs 54 which underlie the soundboard 56 of the grand piano 32. The baffle 44 is constructed of plastic material, such as "Mylar", and is relatively thin and serves as a moisture distribution sheet for moisture produced when the heater 18 evaporates water from the tank 12. To enhance the moisture distribution and to eliminate possible condensation on the soundboard 56, a depending skirt 47 is provided on each wing 46 which has holes 49 and vertical slits 51 to receive the split tubes 48. The skirts force the warm humid air to travel further before reaching the soundboard and thus be cooler, reducing the possibility of condensation.

Figure 5:
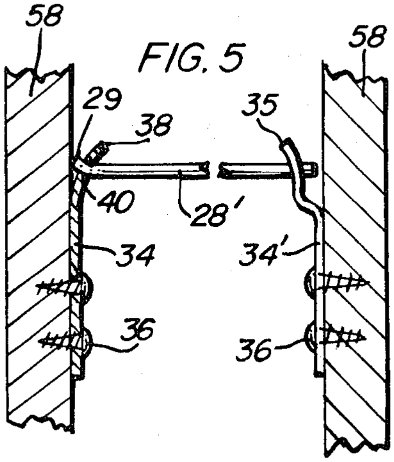
FIG. 5 is a sectional view similar to FIG. 3, but illustrating a support rod extending from the surface of the rim forming part of the grand piano.

FIG. 5 illustrates alternative support rods 28' and mounting for use in arrangements where the rod is mounted between the rim 58 of the grand piano and the brace or when mounted between braces. In this arrangement the supporting rod 28' has an angulated upturned end 29 received through the aperture 40 in the outwardly curved end portion 38 of the clip 34 which is secured to the rim 58 by screw threaded fasteners 36. The other end of rod 28' is inserted through a hole in the offset end portion 35 of bracket 34'. The upset end 29 of rod 28' keeps it engaged with clip 34 and offset portion 35 keeps the other end of rod 28' from slipping out. The rod length must be cut to a close fit between the opposed surfaces.

Figure 10:
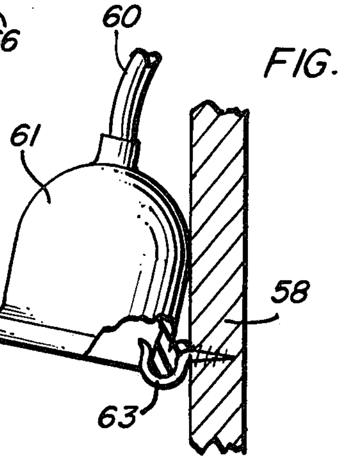
FIG. 10 is a plan view of the filling funnel with portions sectioned to show the supporting hook structure.

When installing this embodiment of the humidifier, it is necessary to observe the grand piano from the undersurface thereof as illustrated in FIG. 6 and mount the tank between the braces or between one brace and the rim whichever is nearest to the center of the soundboard 56. After holding the tank in position with the supporting rods in place and after it has been determined that one end of the tank can be disengaged from the supporting rod and dropped to enable the evaporative pads to be changed, appropriate markings are placed on the components of the piano and the clips are then mounted in place so that the tank will hang horizontally with the support rods parallel to the soundboard. The tank is then dropped downwardly and the moisture distribution baffle 44 is placed so that it lines up with the center of the tank with the baffle or sheet being straight and uncreased. Thereafter, the tank is repositioned and the grommets 42 are slid into a position closely adjacent the bracket straps 24 on the tank 12. A fill tube 60 has one end cut at a 45° angle and anchored in the tank 12 so that the end is one inch above the normal full level of the water in the tank to prevent the tube from siphoning water from the tank. The tube 60 is positioned along the inside of rim 58 and secured in place by a clamp 62 and half-clamps 64. A funnel 61 is attached to the other end of the fill tube 60 with about 18 inches of the tube being free to enable the funnel 61 to be elevated above the piano lid when pouring water into the tank. The funnel 61 is supported against the inner surface of rim 58 by a horizontal screw hook 63 as shown in FIG. 10. This arrangement prevents the funnel from being lost or misplaced. An appropriate container of known volume, such as one-half gallon, may be provided to add water to the tank 12 from exteriorly of the piano without disturbing the tank. Thus by initially filling the tank to its normal full level and then adding one-half gallon when a warning light 66 signals a low water condition, the tank 12 will not be overfilled.

Figure 7:
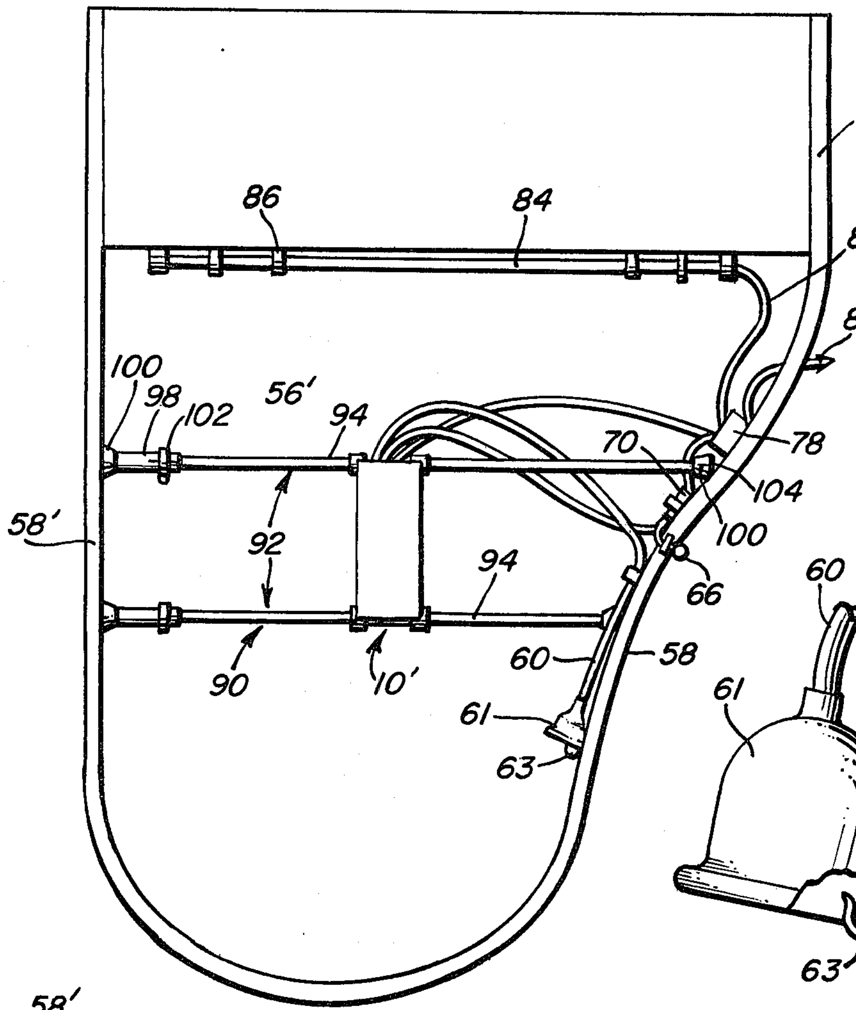
FIG. 7 is a plan view similar to FIG. 6 but illustrating telescopic supporting tube assemblies between the front and rear rim of a grand piano.
Figure 9:
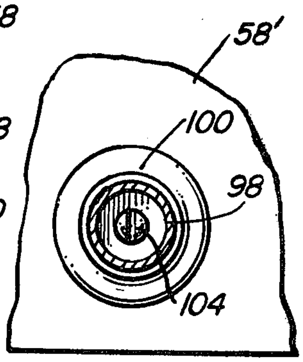
FIG. 9 is a transverse sectional view of the tube taken generally along section line 9—9 of FIG. 8 showing additional details of the mounting structure.
Figure 8:
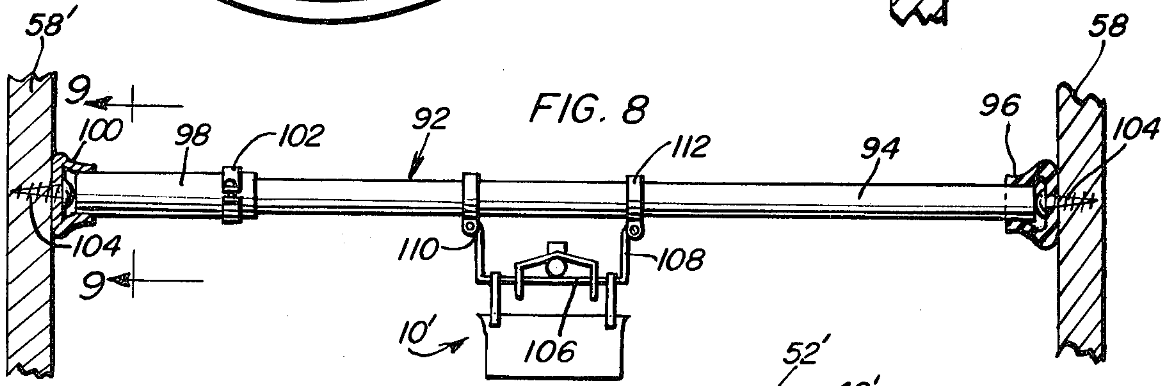
FIG. 8 is an elevational view of one of the telescopic tubes with the end caps shown in section.

FIGS. 7–9 illustrate a supporting arrangement used with grand pianos of the type which do not use any braces or posts under the soundboard 56'. The supporting arrangement 90 includes a pair of telescopic tube assemblies 92 each of which includes an elongated tube 94 having an end cap 96 thereon and a shorter tube 98 having an end cap 100 thereon. The tube 98 has a split end telescopically received over the end of tube 92 and secured in longitudinal adjustment by a split clamp 102. Each end cap 96 and 100 is constructed of plastic material and a screw 104 extends through the cap into the front and rear rims 58 and 58'. Thus, the two end caps are mounted by using screws 104 and the tubes 94 and 98 are expanded into telescopic relation to the end caps and the split clamps 102 tightened to lock the tube in extended position.

The tank 12 is supported from U-shaped rods or bails 106 which replace rods 28 and which extend upwardly at their ends as at 108 and terminate in hooks 110 which engage supporting clamps 112. The position of the humidifier 10' may be varied along the length of the tubes 94 by loosening the clamp brackets 112 and sliding them to desired positions and then retightening them. Also, the electrical cable, fill tube and the like may be tied to the tube assembly 92 in order to keep these components from dropping into view. This embodiment is associated with the dehumidifier, humidistat, warning light and the like in the same manner as in FIGS. 1-6.

Figure 11:
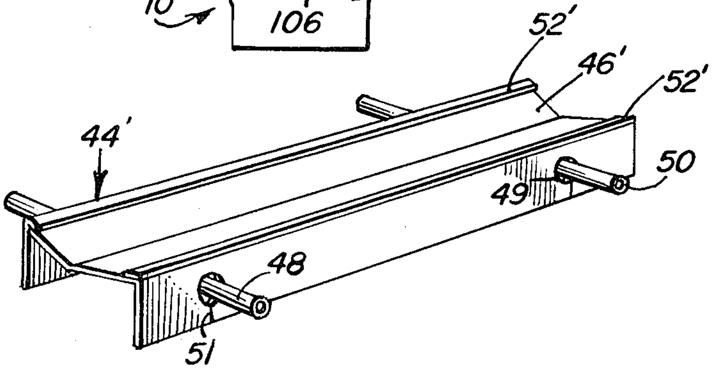
FIG. 11 is a perspective view of the baffle illustrating another embodiment thereof.

FIG. 11 illustrates a modified construction of the baffle 44′ in which the wings 46′ are inclined downwardly and inwardly to form a shallow trough with an anti-rattling felt strip 52′ along the outer top edge portion of each wing 46′.

To provide for automatic operation of the humidifier, a low warning light 66 is positioned below the rim 58 and includes a cord 68 connected into a juncture device 70 in a cord 72 which also is connected with a cord 74 extending to a low water dip stick 76 positioned in the tank 12. The cord 72 extends to a humidistat 78 that is provided with a power cord 80 which is plugged into a wall outlet, or the like. Also, the heater 18 is provided with a power cord 82 which is also plugged into the humidistat. Also, as illustrated in FIG. 6, a dehumidifier in the form of a heating rod 84 is supported below the braces 30 by clips 86 with the dehumidifying heater 84 being provided with a cord 88 also plugged into the humidistat 78 to provide control for the humidity. The specific control structure including the humidistat and its relationship to the humidifier structure and the dehumidifier structure and the operation of the low warning light is the same as that disclosed in the above-mentioned prior patents and is incorporated herein by reference thereto.

During operation, when the water level in the tank reaches a predetermined low point, the warning light 66 will be activated and at that point, a predetermined quantity of water, such as two quarts, should be added to the tank by using the filler funnel 61 and the filler tube 60. Also, the evaporator pads should be replaced periodically, such as annually or whenever they become clogged with mineral coating. When doing this, it is only necessary to drop one end of the tank with any water therein being collected in a pan, bucket, or other receptacle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A humidifier for a grand piano or other small enclosed space comprising a tank receiving a supply of water, support means for the tank extending between structural components of the grand piano or other enclosed space, a heater positioned longitudinally of the top of the tank and supported above the water level in the tank, evaporative pad means extending from the heater into the water in the tank to facilitate evaporation of water from the tank, and a baffle positioned above the heater and adapted to be oriented closely below the central portion of the soundboard of a grand piano, said baffle including an elongated inverted channel-shaped member positioned longitudinally centrally of the tank in spaced relation above the heater, and means supporting the baffle from the tank support means, said support means for the tank including a pair of elongated support rods, each end of the tank having a pair of spaced brackets, hook means on the upper ends of the brackets for detachable engagement with the support rods, said means supporting the baffle including a pair of elongated tubes with one of the tubes being disposed adjacent each end of the baffle, said tubes having the baffle secured thereto, the lower surface of the tubes being longitudinally split to enable the tubes to be positioned over the support rods between the support brackets attached to the tank thereby supporting the baffle in centralized relationship to the tank.

2. The structure as defined in claim 1, together with a felt strip means secured to the baffle to serve as an anti-rattling means for contact with the ribs underlying the soundboard of a grand piano.

3. The structure as defined in claim 2, wherein said baffle has a lower central portion with the felt strip means being in the form of a pair of felt strips along the top outer edge portions thereof.

4. The structure as defined in claim 2, together with means supporting the ends of the support rods from structural components, said means including clips having one end secured to the structural components and the other end having an aperture closely receiving the end of the support rods, said clips being deflected from their normal position when receiving the support rods whereby the apertures frictionally engage and secure the support rods to prevent longitudinal movement thereof after installation.

5. The structure as defined in claim 4, together with slidable grommets on the support rods of resilient material to be moved along the support rods into close adjacent relation to the support brackets to centralize and retain the support brackets and tank in desired position on the support rods.

6. The structure as defined in claim 5, together with a refill tube having one end positioned in the tank, means supporting the refill tube along the inner surface of the rim of a grand piano adjacent the lower edge thereof, a funnel on the end of the refill tube, means detachably supporting the funnel in concealed position along the inner surface of the rim to enable the funnel to be moved to accessible position with the refill tube being sufficiently long to enable the funnel to be raised above the top of the tank for gravity feed of water into the tank to enable the tank to be refilled with water without having access to the tank.

7. The structure as defined in claim 1, wherein said support rods are in the form of U-shaped bails, said support means for the tank also including a pair of telescopically adjustable tubes extending between structural components of the piano in parallel relation to the support rods, and supporting members interconnecting the adjustable tube and the ends of the U-shaped bails.

8. The structure as defined in claim 7, wherein each end of each tube is provided with an end cap, means securing the end caps to opposed surfaces of the structural components of the piano.

9. The structure as defined in claim 1, wherein each edge of the baffle includes a depending skirt having an opening and slit receiving the split tubes.

10. A humidifier for a piano or other musical device having a soundboard with structural components disposed below the soundboard and defining a small space for receiving the humidifier, said humidifier comprising an open-topped tank provided with a supply of water, means supporting the tank from the structural components in the small space, a baffle overlying the tank and disposed below the soundboard, means supporting the baffle from said tank supporting means, said baffle supporting means enabling assembly of the baffle with the tank after the tank is supported by the tank support means, and means associated with the tank to facilitate vaporization of water from the tank.

11. The humidifier as defined in claim 10 wherein said baffle includes a member extending throughout the length of the tank and having downwardly extending side edge portions disposed inwardly of the sides of the tank to return any condensation back to the tank, said means facilitating vaporization of water including a heater in the tank above the water and below the baffle, and absorbent pad means supported from the heater and extending downwardly into the water.

12. The humidifier as defined in claim 10 wherein said means supporting the tank includes a pair of support rods having end portions adapted to be supported from structural components of the musical device, said means supporting the baffle including a pair of split plastic tube for positioning over the support rods and supportingly connected to the baffle.

13. The humidifier as defined in claim 10 wherein said means supporting the tank includes a pair of telescopic tubes having means on the ends thereof for engagement with opposed surfaces of structural members of the musical device and a pair of supporting bails interconnecting the telescopic tubes and the tank, said baffle supporting means being connected to said bails above the tank.

* * * * *